3,297,528
STABLE PERFUSABLE COMPOSITION FOR THE TREATMENT OF TUBERCULOSIS

Paul Metadier and Alphonse Voisin, Tours, France, assignors to Laboratoires Paul Metadier Societe Anonyme, Tours, France, a corporation of France
No Drawing. Filed Dec. 26, 1963, Ser. No. 333,622
Claims priority, application France, Jan. 10, 1963, 920,945
6 Claims. (Cl. 167—65)

Medicaments for the treatment of tuberculosis are presently known, such as isoniazide (I.N.H.), streptomycin, and paraaminosalicylic acid (P.A.S.), which are used alone or in combination; and it is known that, in order to obtain the best results, compositions that can be used in venous perfusions have been sought. P.A.S. by itself, for example, is perfusable and sometimes isoniazide and streptomycin have been extemporaneously combined with it in the same bottle.

Thioamide of α-ethylisonicotinic acid or ethionamide having the formula

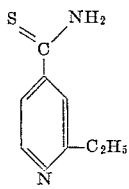

is likewise known as an active agent in the treatment of tuberculosis.

There is likewise known a new method of using ethionamide therapeutically, that is, as a venous perfusion. The basic form of ethionamide is but little soluble, but its chlorhydrate form is soluble and produces an acid solution.

In the venous perfusion treatment, although ethionamide chlorhydrate can be combined with I.N.H. and streptomycin, it is presently not possible to combine ethionamide chlorhydrate with P.A.S. because the two are only slightly soluble in the presence of each other.

The purpose of this invention is to avoid this disadvantage and to obtain solutions of ethionamide that have a determined pH and which are miscible with a P.A.S. solution to form a stable perfusable composition for the treatment of tuberculosis. Other medicaments currently used in the treatment of tuberculosis can be added to the mixture of the invention. Thus, in accordance with the invention, it was possible to combine 600 mg. of ethionamide chlorhydrate (or 500 mg. of the basic form) with a bottle of injectable P.A.S. (500 ml. of 3% solution) to form a perfusable solution.

In conformance with the invention, an ethionamide chlorhydrate solution of a defined pH is obtained by adding to the solution a compound comprising at least one amide function and advantageously having the general formula:

$$R'—CO—NH_2 \quad (1)$$

where R′ represents hydrogen or an alkyl group. The amides most appropriately used, in accordance with the invention, are formamide, acetamide, methylacetamide, and propylacetamide.

Ethionamide (or its salts) is miscible in solutions of compounds having the Formula 1 at pH's above 6. As remarked above, the solutions obtained in accordance with the invention can be injected as a perfusion in the presence of customary additional agents, such as electrolytes, amined acids, monosaccharides, alcohols, etc. In such perfusable solutions, it can be readily understood that the tuberculo-static power of ethionamide is increased because of the high diffusibility of the latter.

One of the fundamental practical advantages of solutions of ethionamide (or of its salts) in solutions of compounds having the general Formula 1 lies in the fact that they are miscible with a P.A.S. solution and that the resulting mixture can, in addition, be combined with other known tuberculo-static compounds, such as I.N.H. or streptomycin. Thus, it is possible to obtain solutions containing up to one gram of ethionamide (chlorhydrate) per therapeutic dose and including from one to five percent (preferably three percent) of sodium paraaminosalicylate and the customary therapeutic doses of I.N.H. and streptomycin. Using compounds having the general Formula 1 as agents for potentializing and making soluble the solution, there has been obtained the combination of ethionamide and paraaminosalicylic acid in an injectable solution of which the pH lies between 6 and 8.5.

The method for preparing such solutions consists in mixing the compounds in the appropriate amounts to obtain a final, stable solution that is buffered to have a pH around that of blood, that is a pH between 6 and 8.5 and preferably around 7.5.

There will now be described two practicable examples of how such solutions containing ethionamide (chlorhydrate or its other salts) in combination with P.A.S. and other tuberculo-static agents can be obtained.

EXAMPLE 1

*The combining of ethionamide with P.A.S. in the form of a perfusable solution having the pH of blood*

In the presence of an antioxidant, such as sodium hydrosulphite, 500 mg. of ethionamide chlorhydrate, 500 mg. of acetamide, and 15 g. of sodic P.A.S. were mixed in 500 ml. of distilled water. To this was added a sufficient quantity of sodium bicarbonate to bring the pH of the solution to between 7 and 8.5, the pH being measured with a meter as the sodium bicarbonate was added.

After sterilization, there was obtained a ready to use solution that was perfusable and stable and contained 500 mg. of ethionamide (chlorhydrate) in combination with 15 grams of sodic P.A.S.

EXAMPLE 2

The combination of ethionamide P.A.S., no longer in the presence of a prepared solution of acetamide, as in Example 1, was prepared as a ready-to-use solution, except in the form of compounds miscible at the time they are to be used: in other words, in the form of an extemporaneous solution.

Five hundred milligrams of a salt of ethionamide originally kept in a separate bottle were dissolved in a concentrated solution of acetamide stored separately in an ampoule.

In addition, there was available a bottle containing 250 to 600 ml. of P.A.S. solution having a concentration between 3 and 5% and stabilized in the presence of monosodium carbonate and an antioxidant.

The solution of ethionamide-acetamide was then poured into the solution of P.A.S. to obtain the same solution as in Example 1.

It is apparent that various additional therapeutic agents can be added to the prepared solutions of Examples 1 and 2, such as nicotinic amide, sorbitol, sympatholitic agents, and even other tuberculo-statics, such as I.N.H. or streptomycin in therapeutic amounts.

It is possible to obtain similar solutions that are extemporaneous or that are prepared before hand containing an amount of ethionamide other than 500 mg., such as 600 mg.; of ethionamide chlorhydrate with a sufficient quantity of acetamide to form a solution, for equal amounts of the other constituents of the mixture. In accordance with the invention, there is thus obtained a solution of ethionamide in a compound having the Formula 1 in combination with paraaminosalicyclic acid P.A.S. in the form of its chlorhydrate or of its other salts, said solution containing therapeutic quantities of ethionamide (up to one gram per administered dose) and from one to five percent of P.A.S.

What we claim is:

1. A perfusable composition for the treatment of tuberculosis having a pH between 6 and 8.5 and containing, (A), a compound selected from the group consisting of ethionamide and its non-toxic, therapeutically acceptable acid addition salts, (B), 1 to 5% by weight of the total composition of a compound selected from the group consisting of p-aminosalicylic acid, its alkali metal salts and its non-toxic, therapeutically acceptable acid addition salts, and (C) a compound of the formula R'—CO—NH$_2$ wherein R' is selected from the group consisting of hydrogen and lower alkyl.

2. The perfusable composition of claim 1, wherein the amount of ethionamide administered ranges up to one gram per therapeutic dose.

3. The perfusable composition of claim 1, wherein the pH lies between 7 and 8.5.

4. The perfusable composition of claim 1, having the constituents:

| | | |
|---|---|---|
| ethionamide (chlorhydrate) | mg | 500 |
| acetamide | mg | 500 |
| distilled water | ml | 5 |
| P.A.S. | gr | 15 |
| sodium hydrosulphite | mg | 500 | sufficient quantity of $Na_2CO_3$ and $NaHCO_3$ to buffer to a pH of 7.5, distilled water, sufficient quantity to obtain 500 ml.

5. The perfusable composition of claim 1, wherein the amides used are chosen from the group consisting of formamide, acetamide, methylacetamide, and propylacetamide.

6. The composition of claim 1 which also contains up to one gram per administered dose of a tuberculo-static selected from the group consisting of isoniazide and streptomycin.

References Cited by the Examiner
FOREIGN PATENTS
1,306,607  10/1962  France.

JULIAN S. LEVITT, *Primary Examiner.*

L. B. RANDALL, *Assistant Examiner.*